[19] United States Patent
Loggers

[11] 4,394,176
[45] Jul. 19, 1983

[54] METHOD OF PRODUCING SILICATE-CONTAINING GRANULATES

[75] Inventor: Hendrik Loggers, Amerongen, Netherlands

[73] Assignee: Aarding Weerstandlas B.V., Netherlands

[21] Appl. No.: 341,046

[22] Filed: Jan. 21, 1982

[51] Int. Cl.$^3$ .............................................. C04B 15/13
[52] U.S. Cl. .................................................... 106/120
[58] Field of Search ........................... 106/120; 264/85

[56] References Cited

U.S. PATENT DOCUMENTS

| | | | |
|---|---|---|---|
| 2,400,884 | 5/1946 | Lloyd | 106/120 |
| 3,192,060 | 6/1965 | Tilsen | 106/120 |
| 3,652,311 | 3/1972 | Wielinga | 106/120 |
| 3,717,488 | 2/1973 | Magnan | 106/120 |
| 3,725,032 | 4/1973 | Kihlstedt | 106/120 |
| 3,859,105 | 1/1975 | Feder | 106/120 |
| 4,330,335 | 5/1982 | Kato et al. | 106/120 |

Primary Examiner—James Poer
Attorney, Agent, or Firm—Burton, Parker & Schramm

[57] ABSTRACT

The invention relates to a method of producing silicate-containing granulates having a density of more than 0.7 kg/dm3 and a size of 2 to 40 mm, by mixing sand, a calcium oxide-containing product and water, forming granules and curing same in a moist atmosphere without any substantial condensation of moisture upon the granules to be cured.

The granules contain 10 to 14% of moisture and curing is effected at temperatures above 90° C.

The granules may contain a filler, such as fly ash.

9 Claims, No Drawings

METHOD OF PRODUCING SILICATE-CONTAINING GRANULATES

BACKGROUND OF THE INVENTION

1. Field of the Invention

The present invention relates to a method of producing calcium silicate-containing granulates having a density of at least 0.7 kg/dm3, by mixing a calcium oxide bound-containing product with a silicon-containing product, water and, if desired, a filler, subsequently forming granulates from said mixture and curing of the granulates obtained from said mixture by means of a heating treatment, while maintaining said granulates in a heated vapour atmosphere.

The density of the granulates is more particularly, more than 0.9 kg/dm3.

The term "granulate" should in this instance and in the following be understood as granules of each arbitrary shape being obtained by a pressing, extruding or granulating action and the like. The granules have a size corresponding to the size of normal gravel as used in concrete, which means more particularly, granules having a size of 2 to 40 mm diameter, more particularly, 2 to 32 mm diameter.

2. Description of the Prior Art

A method as described above has been used in the art. In this known method calcium hydroxide is mixed with sand and water and a filler, if any, whereupon the obtained granulates are cured in an autoclave by subjecting them to a steam pressure.

In order to prevent formation of cracks in the granulates which are cured by a steam pressure action, the respective known method is performed in three stages, heated steam being employed in the first stage until a pressure has been achieved of 0.8 ata stream pressure, a subsequent decreased steam pressure being employed in the second stage to e.g., 0.2 ata steam pressure the product in the third stage being heated by steam, by applying a pressure of, for example, 8 to 9 ata steam pressure.

During a curing action in this known method, steam will condense upon the granulates and will subsequently be discharged from the autoclave in the form of a flow of water. If any fillers are used, which contain harmful heavy metals, said harmful metals will be extracted during the condensation of the steam and will be discharged from the autoclave simultaneously with the flow of water, which gives rise to a serious inadmissible environmental pollution.

Additionally the flow of water escaping from the autoclave cannot be used directly for the preparation of fresh steam due to the aforementioned presence of pollutions derived from the harmful heavy metals in the granulates.

It is a further drawback of said known known method that it is rather difficult to perform the same, due to the application of three separate stages whilst, moreover, the prevention of cracks in the cured and hardened granulates is ineffective.

SUMMARY OF THE INVENTION

It is a primary aim of the present invention to provide a method which does not present the aforementioned drawbacks.

This object is attained according to the invention in that the heated vapour atmosphere is formed by having a whether or not moist heating fluid act indirectly upon the granulates, so eliminating any direct moisture condensation from the heating fluid upon the granulates.

Due to this measure cracks formation, more particularly a fissure formation in the granulates is absolutely excluded, so that granulates having excellent strength properties are obtained without the necessity of performing the method in separate stages.

It is another advantage of the present invention that water, if any, condensed during the action of the heating fluid, can be used directly for the preparation of freash steam.

A final additional advantage of the method in accordance with the invention is that the steam obtained during the indirect heating of the granules can be discharged and condensed so that the heat, present in said steam, can be recovered.

In an extremely advantageous embodiment of the present invention the moist granulates are disposed in a closed space and indirectly heated due to the action of a moist heating fluid, more particularly steam, upon the outer side of the closed space. Although in this embodiment steam will condense on the outer side of said space, the condensed quantity of water will not come into contact with the granulates and will therefore be uncapable of retracting harmful substances from the granulates, so that the obtained condensed water may be directly fed back to the device for preparing fresh steam.

More particularly the latter method is performed such, that the moist granulates accommodated in a closed vessel, at least comprising one pressure leveling opening, are disposed in a pressure vessel through which heated steam is passed.

The steam used for the heating treatment in the method according to the invention, may whether or not comprise gases, such as air.

In a further very advantageous embodiment the moist granulates are disposed in a closed space, e.g. a pressure vessel, indirect heat being fed to said space by means of a non-moist liquid heating fluid, e.g. heated oil, recycling through a pipe circuit disposed at the inner side of the pressure vessel.

In this manner extremely good granulates are obtained, having excellent properties.

The curing temperature amounts for granulates to at least 30° C., but in practice for granules of calcium oxide and sand a temperature of 135°–230° C. is used; if the granules contain fly ash the temperature may be 100° C. or even less, e.g. 90° C.

The drawbacks as described above, with respect to known methods, harmful metals then being lixiviated by means of condensed steam, are especially of importance in those methods in which a filler is used in the form of fly ash, as said fly ash contains an extremely good percentage of very harmful metals.

In the method acording to the invention, granulates of the desired strength can either be obtained by forming very slight quantities of condensed steam or forming no condensed steam at all in case that a heating oil is used.

The drawbacks inherent with the use of fly ash, also apply to fillers in the form of blast furnace slags or other metals obtained by an entire or partial combustion of coals and, more particularly to dredging-sludge, such as e.g. sludge dredged from big harbour sites, as the latter sludge may contain extremely good quantities of harmful metals.

Additional fillers, which may be used in granulates according to the present invention without causing any harmful effect, are, for instance, caught finely powdered ore particles emitted in blast furnaces, pyrite ash and waste substances emitted when converting bauxite into aluminium.

It is particularly recommended to apply 25% of moisture based on the moist material to be used for preparing the granulates, while, more particularly, at most 15% of moisture is applied. Very conveniently 10–14% of moisture is present in the granules to be cured.

The granulates obtained according to the present invention are very suitable for use as gravel-replacing additives in the case that concrete mortar has to be prepared, which is extremely important, as due to the ever higher environmental demands preventing any further excavation or dredging of gravel, a substantial shortage of gravel will occur within a short delay.

The features of the present invention which are believed to be novel are set forth with particularity in the appended claims.

Other claims and many of the attendant advantages will be more readily appreciated as the same becomes better understood by reference to the following detailed description and considered in connection with the examples.

DESCRIPTION OF EXAMPLES

EXAMPLE 1

120 kg of calcium hydroxide (slaked lime) is mixed with 220 kg of sand, 100 kg of water and 660 kg of fly ash, whereupon rounded granules of 2 to 32 mm diameter are formed from said mixture. The produced moist granules of 2 to 32 mm diameter are disposed in an almost closed, round container or vessel having a length of 5 m and a diameter of approximately 2 m and comprising one or more small pressure leveling openings for the escape of a heated vapour atmosphere from said container or vessel.

Five containers or vessels of this type are subsequently accommodated in an autoclave having a diameter of 2 m and a length of 20 m, whereupon over-heated steam having a temperature of 120° C. is fed into said autoclave.

When said heated steam acts upon the outer side of the respective containers, moisture will condense, but said moisture will not come into contact with the granules so that harmful agents or other substances cannot possibly be extracted from said granules.

Granules having the desired strength properties will be obtained after an action lasting for some hours, of the aforementioned overheated steam. The use of the above containers involves that a very high grade of filling of the autoclave can be obtained.

EXAMPLE II

A round pressure vessel having a diameter of 2 m and a length of 20 m, internally comprising a closed pipe circuit, is provided with moist granules obtained in the same manner as described in Example I.

Heated oil, having a temperature of 150° C. is recycled through the closed pipe circuit. Said heated oil transmits indirect heat toward the granules, thus causing these granules to be gradually heated while emitting moisture, so that a heated vapour atmosphere is formed around the granules.

Said heated vapour atmosphere in the form of steam is caused to escape from the pressure vessel and is subsequently condensed while recuperating heat. The water, obtained by said condensation may be used as very pure processing water for a further production of granulates.

Obviously, instead of heated oil, a heated gaseous fluid can also be recycled through the closed pipe circuit.

EXAMPLE III

Example II is repeated but the autoclave remains closed during the gradual heating to a temperature of 160° C.

What is claimed is:

1. A method of producing calcium silicate-containing granulates by mixing a calcium oxide bound-containing product with a silicon-containing product, water and, if desired, a filler, subsequently forming granulates from said mixture by means of a heating treatment, while maintaining said granulates in a heated vapour atmosphere, wherein said heated vapour atmosphere is formed by having a heating fluid chosen from moist and non-moist heating fluids acting indirectly upon the granulates in such a way that any direct moisture condensation from the heating fluid upon the granulates is prevented.

2. The method of claim 1, wherein the moist granulates are disposed in a closed space and indirectly heated, due to the action of a moist heating fluid upon the outer side of the said closed space.

3. A method according to claim 2, wherein the moist granulates accomodated in a closed vessel, at least comprising one pressure leveling opening, are disposed in a pressure vessel through which heated steam is passed.

4. The method of claim 1, wherein the moist granules are disposed in a closed space, indirect heat being fed to said space by means of a non-moist liquid heating fluid.

5. The method of claim 1, wherein the formed steam emitted from the moist granules during the indirect heat supply, is discharged.

6. The method of claim 1, wherein the formed steam emitted from the moist granules during the indirect heat supply, is discharged and subsequently condensed, while recuperating the heat present therein.

7. The method of claim 1, wherein the moist granules to be cured contain less than 25% of moisture.

8. The method of claim 1, wherein the granules are cured at temperatures from 90° C. to 230° C.

9. The method of claim 1, wherein the granules have a size comprised between 2 and 40 mm diameter.

* * * * *

UNITED STATES PATENT OFFICE
CERTIFICATE OF CORRECTION

Patent No. 4,394,176                    Dated July 19, 1983

Inventor(s) HENDRIK LOGGERS

It is certified that error appears in the above-identified patent and that said Letters Patent are hereby corrected as shown below:

In Column 4, Line 43, change "granules" to --granulates--.

Signed and Sealed this

Twenty-seventh Day of September 1983

[SEAL]

Attest:

GERALD J. MOSSINGHOFF

Attesting Officer          Commissioner of Patents and Trademarks